United States Patent
Law et al.

(10) Patent No.: US 6,859,801 B1
(45) Date of Patent: Feb. 22, 2005

(54) EFFICIENT MEMORYLESS PROTOCOL FOR TAG IDENTIFICATION

(75) Inventors: Ching Law, Cambridge, MA (US); Kayi Lee, Cambridge, MA (US); Kai-Yeung Siu, San Jose, CA (US)

(73) Assignee: Massachusetts Institute of Technology, Cambridge, MA (US)

(*) Notice: Subject to any disclaimer, the term of this patent is extended or adjusted under 35 U.S.C. 154(b) by 508 days.

(21) Appl. No.: 09/870,074

(22) Filed: May 30, 2001

Related U.S. Application Data

(60) Provisional application No. 60/210,634, filed on Jun. 9, 2000.

(51) Int. Cl.[7] .............................. G06F 17/30; G01S 5/04
(52) U.S. Cl. ........................ 707/3; 340/10.32; 342/436
(58) Field of Search ................. 707/3; 340/10.32–10.41, 340/10.31, 463, 465, 450; 342/450, 463, 465

(56) References Cited

U.S. PATENT DOCUMENTS

| | | | | |
|---|---|---|---|---|
| 4,209,783 A | * | 6/1980 | Ohyama et al. | 340/825 |
| 5,012,224 A | * | 4/1991 | Drucker | 340/551 |
| 5,450,492 A | * | 9/1995 | Hook et al. | 380/28 |
| 5,521,601 A | * | 5/1996 | Kandlur et al. | 342/44 |
| 5,883,582 A | * | 3/1999 | Bowers et al. | 340/10.2 |
| 5,887,176 A | * | 3/1999 | Griffith et al. | 713/320 |
| 5,920,287 A | * | 7/1999 | Belcher et al. | 342/450 |
| 6,002,344 A | * | 12/1999 | Bandy et al. | 340/10.2 |
| 6,034,603 A | * | 3/2000 | Steeves | 340/10.2 |
| 6,362,737 B1 | * | 3/2002 | Rodgers et al. | 340/572.1 |

OTHER PUBLICATIONS

Lin et al., "Inventory Control System Using R.F. Object Identification", Pub. No. :US 2003/0132835 A1.*

"Microsoft Press Computer Dictionary", Microsoft Press, 1997, p. 251.*

* cited by examiner

*Primary Examiner*—Alford W. Kindred
*Assistant Examiner*—Susan Rayyan
(74) *Attorney, Agent, or Firm*—Fish & Richardson P.C.

(57) ABSTRACT

The invention features a method and system for identifying a plurality of tags using an efficient memoryless protocol. The system includes a reader and a plurality of tags. The reader is adapted to maintain an ordered set of query strings; select a string from the set of query strings; broadcast a query message containing the selected string or a portion of the selected string to the tags; and receive a response from one of the tags. The tags operate without batteries and are adapted to respond to the selected string broadcast by the reader. Accordingly, the tag identification methods are efficient in terms of both time and communication complexities.

30 Claims, 8 Drawing Sheets

| Set of Query Strings (Q) | Query String (q) | Response | Recorded Tag IDs (M) |
|---|---|---|---|
| ε | ε | collision | |
| 0, 1 | 0 | collision | |
| 1, 00, 01 | 1 | collision | |
| 00, 01, 10, 11 | 00 | collision | |
| 01, 10, 11, 000, 001 | 01 | no response | |
| 10, 11, 000, 001 | 10 | 101 | 101 |
| 11, 000, 001 | 11 | 110 | 101, 110 |
| 000, 001 | 000 | 000 | 101, 110, 000 |
| 001 | 001 | 001 | 101, 110, 000, 001 |

FIG. 3

| Set of Query Strings (Q) | Query | Response | Recorded Tag IDs (M) |
|---|---|---|---|
| ε | (short, ε) | collision | |
| 0, 1 | (short, 1) | collision | |
| 0, 10, 11 | (short, 11) | 1 | |
| 0, 10, 11 | (long, 11) | 110 | 110 |
| 0, 10 | (short, 10) | 1 | 110 |
| 0, 10 | (long, 10) | 101 | 110, 101 |
| 0 | (short, 0) | collision | 110, 101 |
| 00, 01 | (short, 01) | no response | 110, 101 |
| 00 | (short, 00) | collision | 110, 101 |
| 000, 001 | (short, 001) | 1 | 110, 101 |
| 000, 001 | (long, 001) | 001 | 110, 101, 001 |
| 000 | (short, 000) | 1 | 110, 101, 001 |
| 000 | (long, 000) | 000 | 110, 101, 001, 000 |

FIG. 4

EFFICIENT MEMORYLESS PROTOCOL FOR TAG IDENTIFICATION

CROSS REFERENCE TO RELATED APPLICATIONS

This application claims priority from U.S. Provisional Application Ser. No. 60/210,634, filed Jun. 9, 2000.

TECHNICAL FIELD

This invention relates generally to electromagnetic tag identification.

BACKGROUND

The emergence of low-power and low-cost sensing technologies enables the development of electromagnetic tags. A tag has a unique ID that is remotely readable via an electromagnetic channel by a tag reader. When attached to consumer goods, the tags can be used as identifiers that may replace Uniform Product Codes (Bar Codes) in the near future. It is because the tags, unlike the bar codes, can be read without direct line of sight. The tags can also be implemented on smart automated systems that exhibit intelligent, collaborative behavior, which may bring drastic improvements on human productivity and efficiency. Example applications of the tags include automatic object tracking, inventory and supply chain management, and Web appliances.

A tag system is similar to a multi-access communication system in that tags and the tag reader share a bandwidth-limited channel. To resolve conflicts in accessing the channel, the tag system uses a collision resolution protocol that requires no prior scheduling or central control, in a similar manner as in a multi-access system. However, additional challenging issues exist in a tag system. Because of severe cost constraint in a tag system, the tags are very limited in memory, power, and computations capabilities. Because of the limited resources available in the tags, it is not desirable for the tags to communicate with each other directly or to maintain dynamic states in their circuitry.

SUMMARY

In a general aspect of the invention, a method of identifying a plurality of tags uses an efficient memoryless protocol. The method includes maintaining an ordered set of query strings; selecting a string from the set of query strings; removing the selected string from the set of query strings; broadcasting to the plurality of tags a query message containing at least a portion of the selected string; and receiving a response from the plurality of tags. If the plurality of tags includes any unidentified tags, the method repeats the selecting step through the receiving step.

Embodiments of the above aspects of the invention may include one or more of the following features.

The query message includes the entire selected string. If the received response identifies one of said plurality of tags, the method includes storing the identity of the identified tag.

If the received response indicates a collision has occurred, a first extension is appended to the selected string to generate a first new query string, and the first new query string is added to the set of query strings. If a collision has occurred, a second extension is appended to the selected string to generate a second new query string, and the second new query string is added to the set of query strings. Appending the first extension to the selected string involves appending the first extension to the end of the selected string as a suffix to generate the first new query string. Appending the second extension to the selected string involves appending the second extension to the end of the selected string as a suffix to generate the second new query string. The first extension and the second extension are binary numbers. For example, the first extension is a one, and the second extension is a zero.

If the received response indicates a collision has occurred, the method further includes appending a 00 to the selected string to generate a first new query string, appending a 01 to the selected string to generate a second new query string, appending a 10 to the selected string to generate a third new query string, appending a 11 to the selected string to generate a fourth new query string, and adding the first second, third, and fourth new query strings to the set of query strings.

The method further includes initializing the set of query strings with a 0 and a 1.

If no collision is detected in the response, the method includes repeating broadcasting the same query message and receiving a response for a pre-determined number of times.

The method further includes estimating the number of tags in the response when receiving the response from the plurality of tags. If the response is from more than one tag, the method skips a string in the set of query strings.

The broadcasting step includes broadcasting a short command in the query message to induce a one-bit response from the plurality of the tags.

In another aspect of the invention, a system for identifying a plurality of tags includes a transceiver; storage; and a controller, the controller programmed to perform the functions of: maintaining an ordered set of query strings in the storage; selecting a string from the set of query strings; removing the selected string from the set of query strings; causing the transmitter to broadcast to the plurality of tags a query message containing at least a portion of the selected string; and receiving through the transceiver a response from the plurality of tags. If the plurality of tags includes any unidentified tags, the controller is programmed to repeat the selecting step through the receiving step.

Embodiments of the above aspects of the invention may include one or more of the following features.

The query message includes the entire selected string. If the received response identifies one of said plurality of tags, the controller is programmed to store the identity of the identified tag.

If the received response indicates a collision has occurred, the controller is programmed to append a first extension to the selected string to generate a first new query string, and add the first new query string to the set of query strings. If a collision has occurred, the controller is programmed to append a second extension to the selected string to generate a second new query string, and add the second new query string to the set of query strings. Appending the first extension to the selected string involves appending the first extension to the end of the selected string as a suffix to generate the first new query string. Appending the second extension to the selected string involves appending the second extension to the end of the selected string as a suffix to generate the second new query string. The first extension and the second extension are binary numbers. For example, the first extension is a one, and the second extension is a zero.

If the received response indicates a collision has occurred, the controller is further programmed to append a 00 to the selected string to generate a first new query string, append a 01 to the selected string to generate a second new query string, append a 10 to the selected string to generate a third new query string, append a 11 to the selected string to generate a fourth new query string, and add the first second, third, and fourth new query strings to the set of query strings.

The controller is further programmed to initialize the set of query strings with a 0 and a 1.

Embodiments may have one or more of the following advantages. The method and system advantageously devise a number of techniques for tag identification, where a tag reader attempts to obtain the unique tag ID of each tag within a readable range. Each tag employs a memoryless protocol that requires minimal computations, memory, and power. The protocol specifies that the current response of each tag depends only on the current query of the tag reader but not on the past query history. Moreover, the only computation required for each tag is to match its ID against the binary string in the query. The tag identification methods are efficient in terms of both time and communication complexities.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 3 is an example of a tag identification process;

FIG. 4 is an example of a tag identification process for incremental matching.

DETAILED DESCRIPTION

Figure 1:
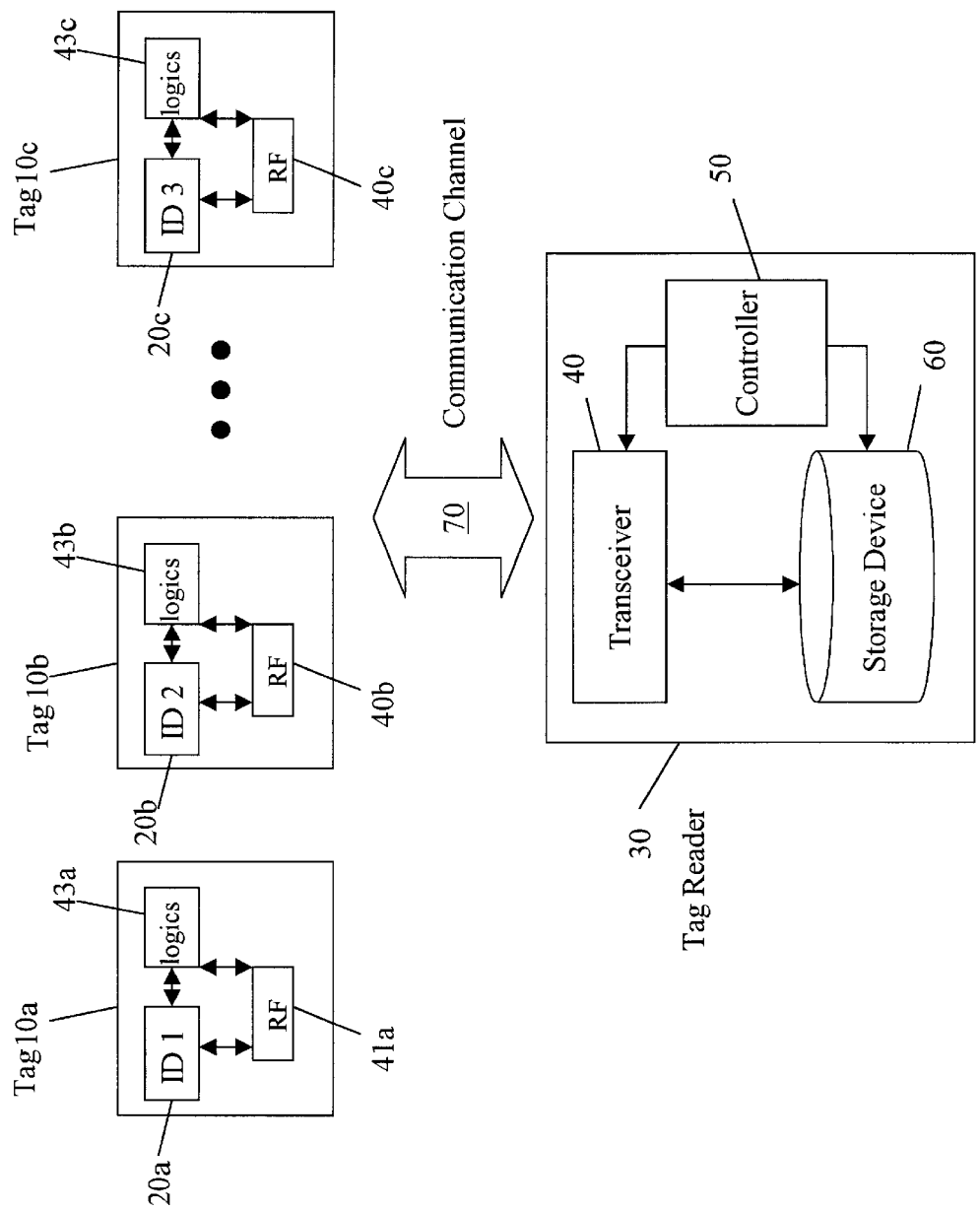
FIG. 1 is a tag identification system including a tag reader and a number of tags.

Referring to FIG. 1, in an embodiment according to the invention, a tag identification system includes an electromagnetic tag reader 30 and a number of electromagnetic tags 10a, 10b and 10c (only three are shown). Tags 10 are located at a distance within a readable range of tag reader 30, and communicate with the tag reader through a single electromagnetic communication channel 70. There is no message exchange between tags 10.

Tag reader 30 includes a transceiver 40, a storage device 60 and a controller 50. Under control of controller 50, tag reader 30 broadcasts query signals stored in storage device 6Q through transceiver 40 to tags 10 via communication channel 70. For the purpose of identifying the tags, each query signal contains a query string that may be a tag ID or a prefix of a tag ID.

Tags 10 have minimal computing circuitry. Tags 10 do not have batteries or any independent power sources, and therefore are passive. Except for an incremental matching technique that will be described below, tags 10 do not maintain dynamic states of the communication process in their circuitry. In other words, tags 10 employ a memoryless protocol, which specifies that the current response of each tag only depends on the current query of tag reader 30, but not on the past history of the reader's queries.

Tag 10 includes an electromagnetic front end 41, which converts electromagnetic energy in the query signal into DC voltage. Powered by the DC voltage, tag logic 43 compares the query string in the query signal against its tag ID stored in memory 20, and transmits results back to tag reader 30 when appropriate. The comparison of tag ID with the query string is the only computation performed by tag logic 43.

To identify the tags, tag reader 30 broadcast a query signal to tag 10s. Each tag 10 uses its electromagnetic front end 41 to detect and receive the query signal, and sends a response back to tag reader 30 if the query signal matches a prefix of its ID. If only one tag 10 responds, tag reader 30 receives the tag ID from the tag and will identify the tag successfully. If more than one tag 10 responds, their responses will collide in communication channel 70, and tag reader 30 will detect a collision as a result.

A tag identification method, as described below, specifies a communication process between tag reader 30 and tags 10, so that the tag reader can collect all the tag IDs at the end of the process. According to the method, tag reader 30 initially does not know anything about the tags. The method requires minimal computations and memory for each tag 10.

Figure 2:
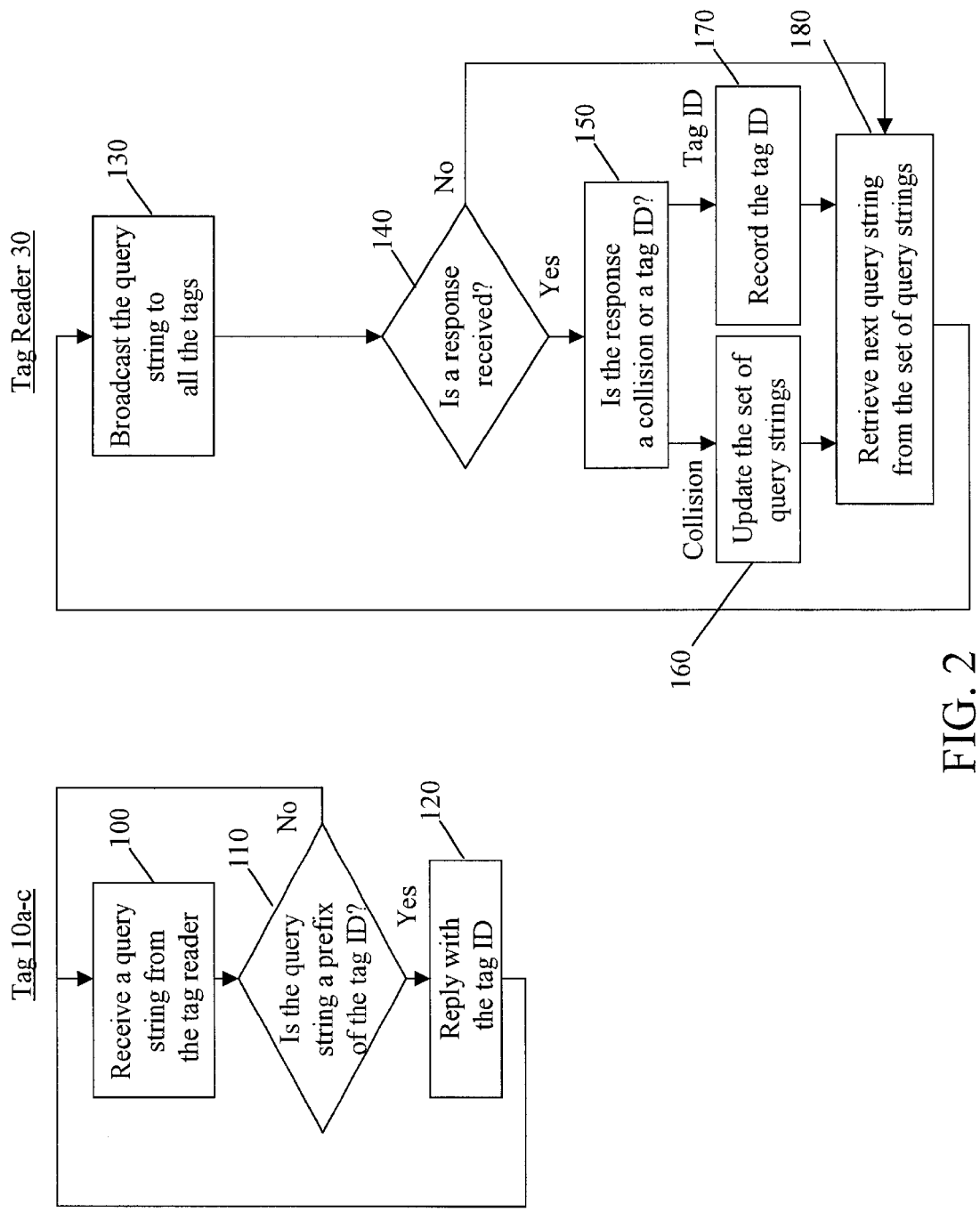
FIG. 2 is a flow diagram illustrating procedures for tag identification at the tags and at the tag reader, respectively.

Referring to FIG. 2, a process is described according to the tag identification method performed at tag reader 30 and at a tag 10. The process consists of rounds of queries from tag reader 30 and responses from tags 10. In each round, tag reader 30 retrieves a query string from a set of query strings stored in storage device 60 and broadcasts the query string to all tags 10 (block 130). Each tag 10 receives the query string from tag reader 30 via communication channel 70 (block 100). Each tag 10 determines if the query string is a prefix of its unique tag ID (block 110). If it is, the tag replies with its unique tag ID (block 120). Tag reader 30 monitors communication channel 70 and determines if a response is received (block 140). If no response is received, tag reader 30 retrieves next query string from the set of query strings (block 180). If a response is received, tag reader 30 determines whether the response is a collision or a tag ID (block 150). When two or more tags 10 have the query string as their prefix, a collision is detected at tag reader 30. If a collision occurs, tag reader 30 updates the set of query strings by appending 0 or 1 to the query string, and adding the two appended query strings to the set (block 160). If the response is a tag ID, tag reader 30 records the tag ID in storage device 60 (block 170). The process repeats until the set of query strings is exhausted. The recorded tag IDs represent the tags having been identified.

A rigorous description of the method, known as the Query-Tree (QT) protocol, is provided in the following. A theoretical discussion on the Query Tree is presented in Appendix A. An algorithmic description of the QT protocol is given below.

Let $A = U^{i=0,k} \{0, 1\}^i$ be the set of strings in $\{0, 1\}$ with length at most k. The state of tag reader 30 is a pair of queue and memory (Q, M) located in storage device 60, where queue Q is an ordered set of strings in A; and memory M is a set of strings in A. A query string transmitted from tag reader 30 is a string q in A. A reply from a tag 10 is a string w in $\{0, 1\}^k$.

At tag reader 30, the queue Q is defined as $\{\epsilon\}$ initially for convenience, where E is the empty string, and memory M is empty. Let (q, x) represent a string formed by appending x to string q, where x is 1 or 0.

1. Let $Q = \{q_1, q_2, \ldots, m\}$.
2. Update Q to be $\{q_2, \ldots, q_m\}$ and broadcast query q, to tags 10.
3. On receiving a response from tags 10:
   If the reply is the string w, tag reader 30 insert the string w into memory M of storage device 60.
   If tag reader 30 detects a collision at communication channel 70, then tag reader 30 updates Q to be $\{q_2, \ldots, q_m, (q_1, 0), (q_1, 1)\}$.
   If there is no reply, do nothing.
4. Repeat the above procedures until Q is empty.

At tag 10, let $w = (w_1, w_2, \ldots, w_k)$ be its tag ID. Let q be the query string received from the reader. If $q = \epsilon$ or $q = (w_1, w_2, \ldots, w_{|q|})$, then it sends string w to tag reader 30. When more than one tag responds at the same time, tag reader 30 detects a collision instead of receiving the messages.

Referring to FIG. 3, an example of the communication process between tag reader 30 and four tags as specified by the QT protocol is provided. Four unique tag IDs of the four tags, i.e., {000, 001, 101, 110}, are unknown to tag reader 30 initially. Tag reader 30 first transmits an empty string "$\epsilon$" to the four tags and a collision is detected (block 200). Tag reader 30 updates the set of query strings Q to {0, 1} and transmit a query string "0" to the tags (block 210). A collision is detected because a number of tags have "0" as a prefix of their tag IDs. Tag reader 30 removes the transmitted string "0" from the set Q. Tag reader also updates Q to be {1, 00, 01} by appending the symbol 0 or 1 to the query string "0" and inserting the two appended strings to the set Q. Tag reader transmits a query string "1" to the tags and a collision occurs as more than one tag have "1" as a prefix (block 220). Tag reader 30 updates Q to be {00, 01, 10, 11}, transmits "00" to the tags, and detects a collision (block 230). Tag reader 30 updates Q to be {01, 10, 11, 000, 001}, transmits "00" to the tags, and receives no response because no tags have "01" as a prefix of tag BD (block 240). Tag reader No 30 updates Q to be {10, 11, 000, 001}, transmits "10" to the tags, and receives a tag ID "101" as response because only one tag has "10" as its prefix (block 250). Tag reader 30 stores the tag ID "101" into the memory M in storage device 60. Tag reader 30 updates Q to be {11, 000, 001}, transmits "11" to the tags, receives a tag ID "110" and stores "110" into M (block 260). Tag reader 30 updates Q to be {000, 001}, transmits "000" to the tags, receives a tag ID "000" and stores "000" into M (block 270). Tag reader 30 further updates Q to be {001}, transmits "001" to the tags, receives a tag ID "001" and stores "001" into M (block 280). At this time, the set Q is exhausted thus terminating the process. The memory M in storage device 60 then contains all the tag IDs.

In reality, it is not possible for tag reader 30 to send the empty string F. Thus, in practice, the method generally starts with Q {0, 1}.

A fault tolerant version of the tag identification method is useful when the communication between tags 10 and tag reader 30 is unreliable. As a result, some tags might not be identified and be considered as missing. The fault tolerant method is designed to trade running time for the probability of missing tags. In particular, a fault tolerant method ($QT^l$) requires repeating a query string q until no collision occurs for l times, where 0 is a positive integer greater than one. The choice of 0 can be made to minimize the probability of a missing tag with query string q. Two theorems (Theorems 3 and 4) of the fault tolerant method are presented in Appendix I.

Further techniques can be used to reduce time complexity, i.e., the running time, of the tag identification process. Theoretical discussions on time complexity are presented in Appendix I. Three techniques, e.g., shortcutting, aggressive advancement and categorization, are introduced in the following description.

Shortcutting. Assume that tag reader 30 detects a collision for a query string q. To continue the identification process, tag reader 30 appends a 1 or a 0 to the current query string q to form a next query string; the order of appending a 1 or a 0 can be randomly chosen. Suppose x and y are complementary binary numbers, i.e., x=1 if y=0, and x=0 if y=1. Assume that tag reader 30 chooses to transmit (q, x) as the next query string. If there are no tags with prefix (q, x), then tag reader 30 knows that there are at least two tags with prefix (q, y). Therefore, the reader skips transmitting the query string (q, y).

The shortcutting technique gives an improved expected running time bound of 2.655n−1.

Aggressive Advancement. Assume that tag reader 30 knows that at least n unrecognized tags exist with prefix q. For example, tag reader 30 may have an a priori knowledge of tagged items in a warehouse, or the tag reader can detect the strength of responses from tags to estimate the number of the tags.

In this situation, it is very likely that that queries containing (q, 1) and (q, 0) will collide. On the other hand, the probability that no collision occurs is $\frac{1}{2}^{n-1}$, which is negligible if the number of tags n is large. Aggressive advancement method updates the set of query string Q by appending two bits to the query string q, and inserting the four appended—query strings to the set Q. In other words, tag reader 30 will transmit query strings (q, 00), (q, 01), (q, 10), and (q, 11) instead of (q, 0) and (q, 1). With this technique, the probability of saving two queries (q, 0) and (q, 1) is $1 - \frac{1}{2}^{n-1}$. Accordingly, the number of queries sent by tag reader 30 is reduced.

Categorization. A categorization technique is used when tag reader 30 has a priori knowledge of the types of tags 10, and therefore knows how to categorize tag IDs. For example, assume that tag reader 30 knows that a set of tag IDs G can be partitioned into $G_1, \ldots G_m$, such that all the tag IDs in $G_i$ have a prefix $q_i$. Under such circumstances, tag reader 30 can identify each set $G_i$ independently, thus reducing the running time. In particular, if the tags are partitioned into m groups, then the upper bound on the expected running time is improved to 2.887n−m.

Two other techniques, i.e., short-long queries (QT-sl) and incremental matching (QT-im), are designed to improve communication complexity of tag reader 30 and tags 10, which is the number of bits sent by the tag reader and the number of bits transmitted by the tags, respectively. It is particularly desirable to reduce the communication complexity of the tags because power consumption of the tags is reduced as a result. Theoretical discussions on communication complexity are presented in Appendix II.

Short-Long Queries. In the QT protocol, as illustrated in the example of FIG. 3, a large number of the responses from the tags end up in collisions. To minimize the number of bits that collide, tag reader 30 transmits two types of queries: short queries and long queries. The short query and the long query contain a short command and a long command, respectively, in addition to a query string in each query. The two types of commands can be represented by one bit. The short queries induce 1-bit responses from tags 10, and the 1-bit responses can be either "0" or "1". The long queries induce the full tag IDs from tags 10. Tag reader 30 sends a long query only when the tag reader knows that only one tag has a prefix matching the query string.

An algorithmic description of the short-long query method is provided below. Let $A=U_{i=0}^{k} \{0, 1\}^i$ be the set of strings in $\{0, 1\}$ with length at most k. The state of tag reader 30 is a pair (Q, M) stored in storage device 60, where the queue Q is an ordered set of strings in A; and memory M is a set of strings in A.

A query transmitted from tag reader 30 is a pair (c, w), where $c \in \{short, long\}$ and w is a string in A. A reply from a tag is a string "1" or a string in $\{0, 1\}^k$.

At tag reader 30, the queue Q is defined as $\{F\}$ initially for convenience, where $\epsilon$ is the empty string, and memory M is empty.

1. Let $Q=\{q_1, q_2, \ldots, q_m\}$.
2. Broadcast short query (short, $q_m$) to tags 10.
3. Update Q to be $\{q_1, \ldots, q_{m-1}\}$.
4. On receiving a response from tags 10:
    If the reply is "1", then
        i. broadcast long query (long, $q_m$) to tags 10;
        ii. insert the response string w into memory M of storage device 60.
    If a collision is detected at communication channel 70, then update Q to be $\{q_1, \ldots, q_{m-1}, (q_m,0), (q_m,1)\}$.
    If there is no reply, do nothing.
5. Repeat the above procedures until Q is empty.

At tag 10, let $w=(w_1, w_2, \ldots, w_k)$ be the tag ID. Let (c, q) be the query string received from tag reader 30. If $q=\epsilon$ or $q=(w_1, w_2, \ldots, w_{|q|})$, then
    If command c is short, it sends string "1" to tag reader 30.
    If command c is long, it sends string w to tag reader 30.

An example of the short-long query method is shown in FIG. 4. At blocks 310, 330, 360, and 380, tag reader 30 sends a long query after it receives a "1" in the reply from one of tags 10. In contrast to the "first-in-first-out" approach described in the QT protocol, the short-long query method adopts a "last-in-first-out" approach. Although either approach can be used for the QT protocol and the short-long query method, the "last-in-first-out" is best used in an incremental matching method as will be discussed below.

Incremental Matching. Incremental matching is another technique designed for reducing the communication complexity. However, the technique requires tag 10 to remember the bit position of the prefix it has matched so far. Therefore, the protocol specified by the method is no longer memoryless.

The incremental matching is very similar to short-long query. Thus, we will only describe the differences between the two techniques.

Figure 5:
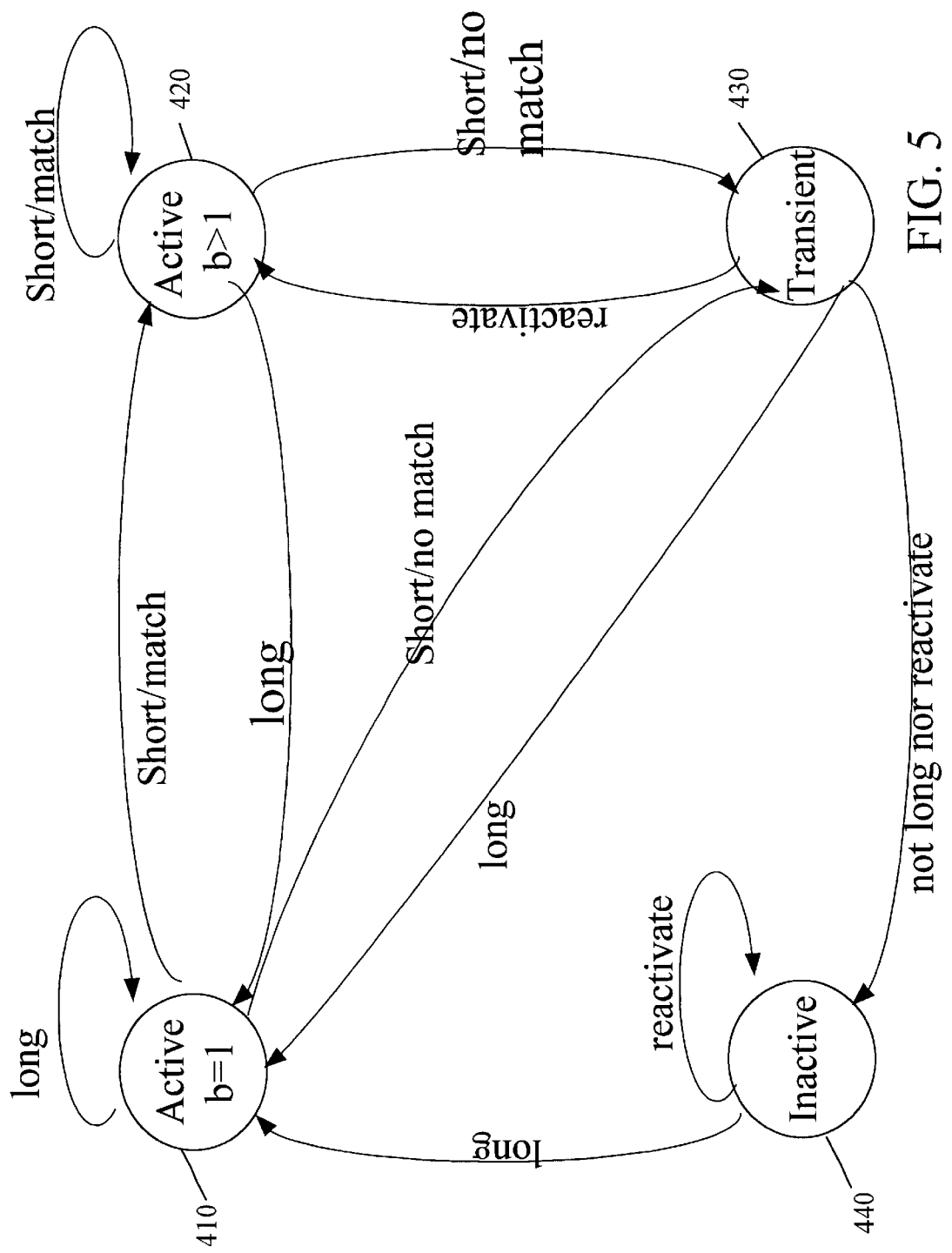
FIG. 5 is a state diagram illustrating an incremental matching technique for tag identification.

Referring to FIG. 5, a state diagram for incremental matching illustrates state transitions in tag 10 when triggered by commands sent from tag reader 30. In incremental matching, each tag 10 has a bit marker $b \in \{1, \ldots, k\}$. Initially, tags 10 are active with the bit marker set to 1 (block 410). Tag 10 remains active if it has responded "1", i.e., a match, in the previous reply to a short query (block 420). If the tag is active, upon receiving a short query string, the tag matches the query string starting from bit b. If the matching is successful, then bit marker b is incremented by 1 (block 420). Any active tag that mismatches would go into a transient state (block 430). A transient state is a state in which a tag 10 enters and stays until it receives a next query from tag reader 30. A tag 10 in the transient state, called a transient tag, will become active (block 420) if the next query is a reactivate command. The reactivate command is sent from tag reader 20 whenever the tag reader receives no response to a short query. Upon receiving the reactivate command, all transient tags will become active again (block 420). Due to an additional command type of the reactivate command, two bits are required to represent a reactivate and a long command. However, a short command only requires one bit, as in the short-long queries. For example, the short, long, reactivate commands can be represented by 0, 10, and 11, respectively.

A transient tag will become inactive (block 440) if the next query is neither a long query nor a reactivate command. If the next query is a long query, the transient tag will become active and reset bit marker b to 1 (block 410). An inactive tag remains inactive (block 440) even when a reactivate command is received.

All tags 10 reset their respective bit markers to 1 and become active again upon receiving a long query (block 410). When a long query is received, each of the tags 10 in active state responds with its full tag ID.

With these extra tag functionalities, tag reader 30 can send query strings incrementally, which would not be possible for short-long queries. For example, if tag reader 30 sent q in the previous query and the tag reader is about to send (q, 1) as in the example of FIG. 4, it can simply send "1" instead. Moreover, it is no longer necessary for tag reader 30 to supply any prefix in a long query.

The communication complexity of the incremental matching for tags is the same as that of short-long query. However, the communication complexity of tag reader 30 is reduced.

A number of embodiments of the invention have been described. Nevertheless, it will be understood that various modifications may be made without departing from the spirit and scope of the invention. Accordingly, other embodiments are within the scope of the following claims.

Appendix I

5 Time Complexity

In this section, we analyze the time complexity of the QT protocol. Assuming that each query-response step takes a fixed amount of time, we count the number of queries sent by the reader in a complete execution of the protocol. We define the identification time of the QT protocol, denoted by $T_S$, as the number of queries sent by the reader in order to identify a set of tags S. As we discussed in the preceding section the underlying algorithm of QT is similar to the confilct resolution algorithms studied in some previous work. Using similar analysis from [7], we can also show that for $n=|S| \geq 4$, $$2.881n - 1 \leq E[T_S] \leq 2.887n - 1$$

for a uniformly distributed random set S, where $E[T_S]$ is the expected identification time. This gives us the average time complexity of the QT protocol. In Section 5.2, we discuss the worst-case time complexity of the protocol. We show that in the worst case, it takes $n \cdot (k+2-\log n)$ steps to identify all the n tags. In Section 5.3, we argue that with high probability, the running time of the protocol is O(n).

To help our analysis in the current section and subsequent sections, we introduce the notion of a query tree, which describes the complete dialogue between the reader and the tags in an execution of the QT protocol. Knowing the size of the query tree, we can find out the identification time of the QT protocol.

5.1 Query Tree

A query tree is a full binary tree (a binary tree in which each node has either two children or no children) capturing the complete reader-tags dialogue of the QT protocol. For a given execution of the protocol, there is a one-to-one correspondence between every node in the query tree and every query sent by the reader. Therefore, the size, i.e. number of nodes, in the query tree is equal to the number of queries sent by the reader.

For any node x in the query tree, let f(x) be the query string in the corresponding query. Also, for a query tree node x, let l(x) and r(x) be the left child and right child of x respectively. If x is a leaf node, then l(x) and r(x) are defined to be NIL.

Definition of a Query Tree

Suppose the QT protocol is executed, and the reader has sent the set of query strings Q. The query tree of the QT protocol is defined recursively by Q.

1. The root of the query tree corresponds to the query string $\epsilon$.
2. If the query tree node x corresponds to the query string q, and both q0, q1 $\in$ Q, the l(x) and r(x) are query tree nodes that correspond to the query strings q0 and q1 respectively. Otherwise, both l(x) and r(x) equal NIL.

Figure 6:
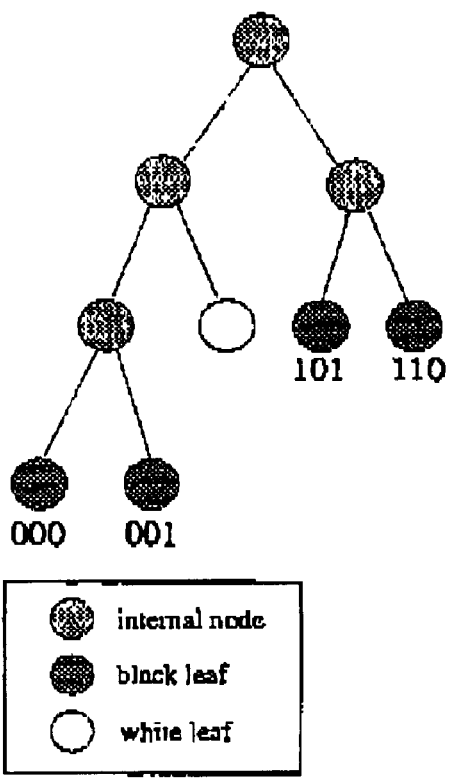
FIG. 6 is a query tree (corresponding to the reference to FIG. 2 in Appendix I, Section 5.1).

See FIG. 6 of the Application Drawings

FIG. 2: The query tree for the example in FIG. 1

The above definition implies that an internal node of a query tree corresponds to a query string that results in a collision in the communication channel. On the other hand, a leaf corresponds to a query string that results in either no reply or a response from exactly one tag. To facilitate our discussion, we shall call a leaf white if the corresponding query string results in no reply, and black otherwise. FIG. 2 shows the query tree for the example in FIG. 1.

Structure of a Query Tree

From the definition of query tree, we have the following observation:

1. The height of a query tree is at most k, since the query string sent out by the reader is at most k bits long.
2. If x is an internal node, then x has at least two black leaf descendants. This follows from the fact that each black leaf corresponds to a unique tag ID and each internal node corresponds to a query that results in a collision.

5.2 Worst-Case Time Complexity

The number of queries sent by the reader equals the size of the query tree. Given a set S of n tags, let $Y_S$ be the query tree for S. Also, let $R_S$ be number of internal nodes of the tree $Y_S$. Since a query tree is a full binary tree, the size of the tree is simply $2R_S+1$.

A simple argument can give a bound on the size of $Y_S$. In a query tree, any internal node is an ancestor of some black leaf. For each black leaf, it has at most k ancestors, which are internal nodes. This gives us $R_S \leq kn$. Therefore, it follows that the size of the tree equals $2R_S+1$, which is no more than $2nk+1$.

An improved result is stated in the following:

Theorem 1 The number of queries sent by the reader to identify n tags is at most $n \cdot (k+2-\log n)$.

Proof. The number of queries sent by the reader to identify n tags equals the size of the corresponding query tree, which has exactly n black leaves. In Appendix A, it is shown that the size of any query tree with exactly n black leaves is no more than $n \cdot (k+2-\log n)$.

5.3 Probabilistic Analysis

Here we show that with high probability, the running time of the QT protocol is O(n).

Mathys and Flajolet [8] claimed that the variance of the running time can be shown to be linear in n, as $n \to \infty$. And this would be sufficient to show that the running time is linear in n with high probability. However, the derivation was omitted in [8] because it is "rather lengthy and complicated".

In the following we will present a proof that QT has linear running time with high probability. We note that by bounding the number of white leaves (as introduced in Section 5), we essentially bound the total size of the tree.

Let $W_n$ be the random variable of the number of white leaves in a query tree with n black leaves. We will apply the Chernoff bound on the upper tail of the distribution of $W_n$. We first need the following technical lemmas.

Lemma 1 For $n \geq 2$, $$E[e^{0.4W_n}] \leq e^{0.4n}.$$

Proof. See Appendix B.

Lemma 2

$$Pr\{W_n \geq \alpha\} \leq e^{0.4(n-\alpha)}.$$

Proof. See Appendix B.

We now show that the running time of QT is O(n) with high probability. In particular, the probability that QT takes at least cn steps decreases exponentially with size n.

Theorem 2 The probability the QT protocol takes at least cn steps to identify n tags is at most $e^{-0.4n(c/2-2)}$.

Proof. When the size of the query tree is larger than $cn-1$, the number of white leaves is at least $cn/2-n$. By Lemma 2, $$Pr\{W_n \geq \alpha\} \leq e^{-0.4(\alpha-n)}$$

for all $\alpha > 0$. Let $\alpha = cn/2-n$, then, $$Pr\{W_n \geq cn/2-n\} \leq e^{-0.4((cn/2-n)-n)} = e^{-0.4n(c/2-2)}.$$

Theorem 3 With failure probability $p \leq 1/2$, the running time of the $QT^l$ protocol is at most $$\frac{3l+9}{2}n - 1.$$

Proof. See Appendix C

Theorem 4 With failure probability p, the probability that the $QT^{(C+1)log_{1/p}n}$ protocol does not identify all tags is at most $1/n^c$.

Proof. The probability that a certain tag is not identified is at most $p^{(C+1)log_{1/p}n}$. Therefore, the probability that any tag is unidentified is $np^{(c+1)log_{1/p}n} = 1/n^c$.

Appendix II

7. Communication Complexity

In this section we turn our attention to the communication complexity of the protocol. The reader communication complexity is the number of bits sent by the reader; and the tag communication complexity is the number of bits sent by a tag. The tag communication complexity is especially important because it is desirable to minimize the power consumption of the tags.

We will first derive the communication complexities of out QT protocol and then introduce several variants that improve upon the performance of QT.

7.1 Basic Query-Tree

In the followings, we will first find the expected number of collisions experienced by a tag. We assume that the bit length k of each tag ID is infinite. This will give us an upper bound for cases where k is finite. We show that in the QT protocol, the expected number of responses a tag makes is no more than 2.21 log n+3.19, where n is the total number of tags.

In the algorithm QT, each tag responds to query strings that match its prefix. It will experience a collision only if there is some other tag having the same prefix, which is the query string sent by the reader.

We consider a system with n tags. Let w be the ID of an arbitrary tag, Let $C_w$ be the number of collisions the tag has experienced. In addition, let $I_w^j$, j=1, . . . be an indicator variable such that:

$$I_\omega^j = \begin{cases} 0 & \text{if none of any other } n-1 \text{ tags has the same } j\text{-bit prefix as } \omega_1 \\ 1 & \text{otherwise.} \end{cases}$$

Then we have the following equation:

$$C_\omega = \sum_{j=0}^{\infty} I_\omega^j. \quad (1)$$

By linearity of expectation, $$E[C_\omega] = \sum_{j=0}^{\infty} E[I_\omega^j]. \quad (2)$$

For each J ∈ {0, 1, 2, . . . }, $E[I_\omega^j] = Pr\{\text{some tag ID has the same } j\text{-bit prefix as } \omega\}$ $= 1 - Pr\{\text{all IDs have a different } j\text{-bit prefix from } \omega\}$ $= 1 - (Pr\{\text{an ID has a different } j\text{-bit prefix from } \omega\})^{n-1}$ $= 1 - (1 - 2^{-j})^{n-1}.$ Therefore, the expected number of conflicting responses the tag experiences is given by:

$$E[C_\omega] = \sum_{j=0}^{\infty} E[I_\omega^j] \quad (3)$$

$$= \sum_{j=0}^{\infty} (1 - (1 - 2^{-j})^{n-1}).$$

A bound on $E|C_w|$ is derived in Theorem 5, which depends on the follwoing technical lemma.

Lemma 3 for all n≥2, $$\sum_{j=0}^{\infty} 2^{-j}(1 - 2^{-j})^n < \frac{\log e + 2e^{-\frac{2}{3}} + e^{-\frac{1}{2}}}{n+1}.$$

Proof. See Appendix D.

Now we are ready to state the theorem and prove it.

Theorem 5 For a system with n tags, a tag is expected to experience no more than 2.21 long n+3.19 conflicts before it successfully transmits its ID.

Proof. See appendix D.

Theorem 6 Let there be n tags to be identified. The expected reader communication complexity for QT is 2.89 kn. The expected tag communication complexity is 2.21 k $\log_2$ n+4.19 k.

Proof. See Appendix E.

Theroem 7 Let there be n tags to be identified. The expected reader communication complexity of QT-sl is at most 3.89 kn+3.89 n. The expected tag communication complexity of QT-sl is at most 2.21 ln n+k+4.19.

Proof. See Appendix E.

Theorem 8 The expected reader communication complexity of QT-im protocol is at most 2.21 n $\log_n$ n+6.10 n.

Proof. See Appendix E.

TABLE 1

Summary of communication complexities of QT, QT-sl, and QT-im. We note that $\log_2 n \leq k$ and k is around 96 m practice.

| | Reader | Tag | Total |
|---|---|---|---|
| QT | 2.89kn | 2.21k $\log_2$n + 4.19k | 2.21kn $\log_2$n + 7.08kn |
| QT-sl | 3.89kn + 3.89n | 2.21 $\log_2$n + k + 4.19 | 2.21n $\log_2$n + (8.08 + 4.89k)n |
| QT-im | 3.21n $\log_2$n + 7.08n | 2.21 $\log_2$n + k + 4.19 | 4.42n $\log_2$n + (11.27 + k)n |

A. Bounding the Query Tree Size

Our objective in this section is to give an upper bound on the size of a query tree with n black leaves. Let T be a query tree with n black leaves. Since it is a complete binary tree, the number of nodes in T is simply 2l−1, where l is the number of leaves in T. Therefore, our goal in this section is to bound the number of leaves l in T. The result will be stated in Theorem 9, which depends on the following Lemmas.

Lemma 4 For any query tree with height k and two black leaves, the number of leaves in the tree is at most k+1.

Proof. Suppose there are m≥k+2 leaves in the query tree. Then the tree has at least k+1 internal nodes. Since the height of the query tree is at most k, there exist two internal nodes in the tree whose depth is the same. Therefore, these two nodes do not have any common decendants. As a result, one of them must have fewer than two black leaf decendants, since there are totally two black leaves in the query tree. This contradicts with the fact that every internal node must have at least two black leaf descendants.

Lemma 5 Suppose T is the largest query tree with exactly n black leaves. If n is even, then the sibling of any black leaf in T is also a black leaf. In n is odd, the same is true except for one black leaf, whose sibling is an internal node.

Proof. First note that the sibling of a black leaf cannot be a white leaf, since otherwise the parent of the black leaf will have only one black leaf descendant. Now suppose there are two black leaves in T whose siblings are internal nodes. Then FIG. 3 illustrates how we can construct a new query tree that is larger than T, which contradicts that T is the largest query tree.

Lemma 6 If T is the largest query tree with exactly n black leaves, where n is odd, then there exists a query tree T' that has exactly n−1 black leaves and has the same size as T.

Proof. By Lemma 5 there is a black leaf in T whose sibling is an internal node. By replacing the black leaf by a white leaf, the modified tree T' is still a valid query tree. In addition, it has n−1 black leaves and has the same size as T.

Figure 7:
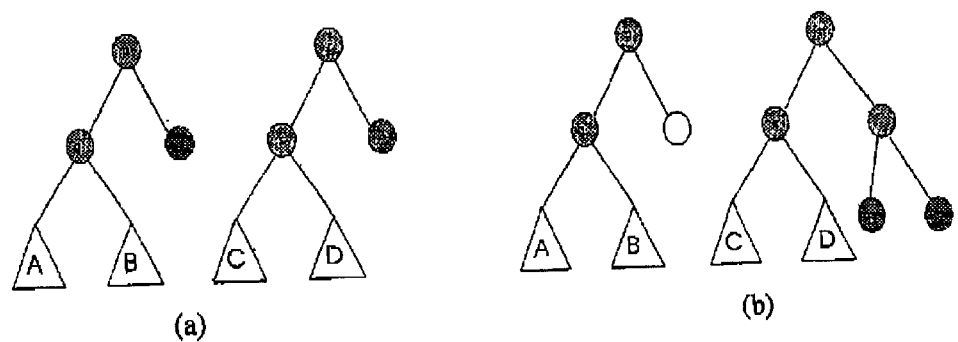
FIG. 7a shows two subtrees of a query tree with an unpaired black leaf (corresponding to the reference to FIG. 3 in Appendix II, Section 7.1).
FIG. 7b shows modified subtrees, the modified query tree having one more white leaf (corresponding to the reference to FIG. 3 in Appendix II, Section 7.1).

See FIGS. 7a and 7b of the Application Drawings

FIG. 3: (a): Two subtrees of a query tree with an upaired black leaf. (b): The modified subtrees. Note that there is one more white leaf in the modified query tree.

Figure 8:
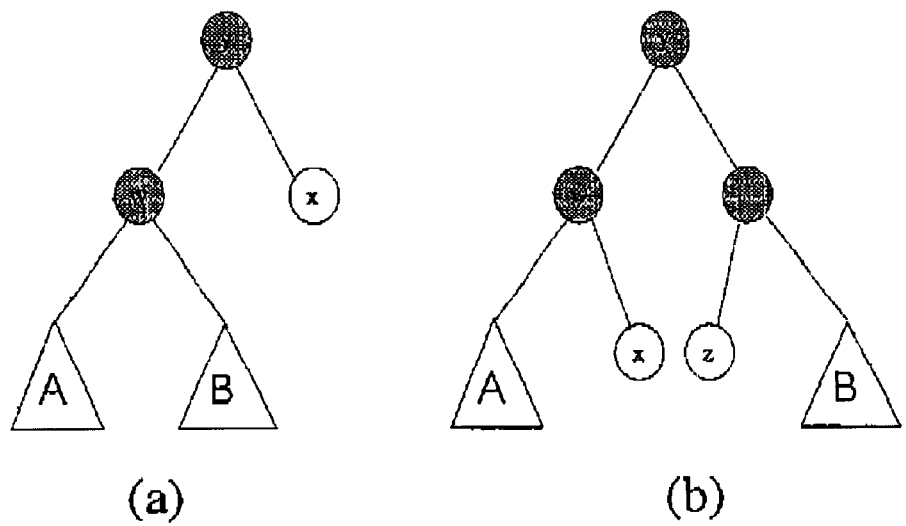
FIG. 8a is a query tree (corresponding to FIG. 4a in Appendix II, Section 7.1).
FIG. 8b shows the result of modifying a query tree with the structure in FIG. 8a into a larger query tree having one more white leaf than the query tree of FIG. 8a (corresponding to FIG. 4b in Appendix II, Section 7.1).

See FIGS. 8a and 8b of the Application Drawings

FIG. 4: Modifying a query tree with the structure in (a) into a larger query tree in (b). The tree in (b) has one more white leaf than (a).

Because of Lemma 6, we only consider the case where n is even. Suppose T is the largest query tree with exactly n black leaves. By Lemma 5, we can pair up all the sibling black leaves in T.

To count the number of leaves in T, we first "cut away" subtrees from T to form a set of subtrees Q, so that any leaf in T belongs to some subtree in Q, as stated in Lemma 7. As a result, the number of leaves in T is simply the total number of leaves in the subtrees in Q. The set Q is defined as follows:

$$Q = \{S_i | S_i \text{ is the largest subtree of T that contains exactly one pair of sibling black leaves}\}. \quad (4)$$

Lemma 7 Suppose T is the largest query tree with exactly n black leaves, where n is even and positive, then any leaf in T will appear in some subtree in Q.

Proof. By definition of Q, every black leaf must appear in some subtree in Q. Suppose there is a white leaf x that does not appear in any subtree in Q. Let y denote the parent of x and S denote the subtree rooted at y. Then at least two pairs of black leaves must appear in S. Suppose only one pair of black leaves appear in S. The fact that $S \notin Q$ implies there is a different subtree $S_i \in Q$ of T such that $S_i$ contains the same pair of black leaves and it is larger than S. This implies S is a subtree of $S_i$. Since $S_i \in Q$, the white leaf x does not appear in $S_i$. As a result, the fact that x appears in S contradicts that S is a subtree of $S_i$.

Given that at least two pairs of black leaves appear in S, FIG. 4 shows the structure of the subtree S. The figure illustrates how we can modify S to construct a new query tree S' that has one more white leaf than S. If we replace S by S' in the query tree T, it would give a new query tree that is larger than T. This contradicts that T is the largest query tree among all the trees with the same number of black leaves.

As a result, we can count of total number of leaves in Q to give an upper bound of the number of leaves in T. Since every subtree in Q has exactly two black leaves, we can apply Lemma 4 to count the number of leaves in each subtree in Q.

Theorem 9 The total number of leaves in a query tree with height k and n black leaves is at most $$\frac{n}{2}(k + 2 - \log n).$$

Proof. Suppose T is the largest query tree with n black leaves. We construct the set of subtrees Q as in (4). For each subtree $S_i$ in Q, let $\text{root}(S_i)$ denote the root of the tree $S_i$ and let $\text{depth}(S_i)$ denote the depth of the node $\text{root}(S_i)$ in T. Then the height of each subtree $S_i$ in Q is at most $k - \text{depth}(S_i)$, since the height of the T is at most k. By Lemma 4, the number of leaves in $S_i$ is therefore at most $k - \text{depth}(S_i) + 1$. Summing over all the subtrees in Q, the total number of leaves, denoted by L(Q), is given by:

$$L(Q) \le \sum_{S_i \in Q} ((k - \text{depth}(S_i)) + 1) \quad (5)$$

$$= |Q|(k + 1) - \sum_{S_i \in Q} \text{depth}(S_i) \quad (6)$$

$$= \frac{n}{2}(k + 1) - \sum_{S_i \in Q} \text{depth}(S_i). \quad (7)$$

Lemma 8 gives a bound on the last term in the above equation.

$$\text{Lemma 8} - \sum_{S_i \in Q} \text{depth}(S_i) \le -\frac{n}{2} \log \frac{n}{2}.$$

Proof. For each subtree $S_i \delta Q$, its root $\text{root}(S_i)$ has depth $\text{depth}(S_i)$ in the original tree T. Since T is a binary tree, and all the trees in Q are disjoint, if we set $h(S_i) = 2^{-\text{depth}(S_i)}$, we have:

$$\sum_{S_i \in Q} h(S_i) \le 1. \quad (8)$$

By the fact that the geometric mean of a set of non-negative numbers is at most their arithmetic mean, we have:

$$\sum_{S_i \in Q} h(S_i) \ge |Q| \cdot \left(\prod_{S_i \in Q} h(S_i)\right)^{T \phi T} \quad (9)$$

$$= |Q| \cdot 2^{\sum_{S_i \in Q} -\text{depth}(S_i) T \phi T} \quad (10)$$

$$= \frac{n}{2} \left(2^{\sum_{S_i \in Q} -\text{depth}(S_i)}\right)^{\frac{2}{n}}. \quad (11)$$

Therefore, by Equation 8, $$\frac{n}{2} \left(2^{\sum_{S_i \in Q} -\text{depth}(S_i)}\right)^{\frac{2}{n}} \le 1. \quad (12)$$

Dividing both sides by n/2, taking the logarithm and then multiplying by n/2 on both sides, we have:

$$\sum_{S_i \in Q} -\text{depth}(S_i) \le \frac{n}{2} \log \frac{2}{n} \quad (13)$$

$$= -\frac{n}{2}\log\frac{n}{2}. \quad (14)$$

Finally, we continue from Equation (7) to prove Theorem 9:

$$L(Q) \le \frac{n}{2}(k+1) - \sum_{S_i \in Q} \text{depth}(S_i) \quad (15)$$

$$\le \frac{n}{2}(k+1) - \frac{n}{2}\log\frac{n}{2} \quad (16)$$

$$= \frac{n}{2}\left(k+1-\log\frac{n}{2}\right). \quad (17)$$

B Proof of Lemmas 1 and 2

Lemma 2 for $n \ge 2$, $$E[e^{0.4W_n}] \le e^{0.4n} \quad (18)$$

Proof. Since $W_0=1$ and $W_1=0$, we have $$E[e^{0.4W_0}] = e^{0.4},$$

$$E[e^{0.4W_1}] = 1.$$

For $n \ge 2$, we have the following recurrence:

$$E[e^{0.4W_n}] = \sum_{i=0}^{n} P_{i,n-i} E[e^{0.4(W_i + W_{n-i})}]_1 \quad (19)$$

where $W_i$ and $W_{n-i}$ are the number of white leaves in the two subtrees. Since $W_i$ and $W_{n-i}$ are independent, we can write Equation (19) as $$E[e^{0.4W_n}] = \sum_{i=0}^{n} P_{i,n-i} E[e^{0.4W_i}] E[e^{0.4W_{n-i}}] \quad (20)$$

First, for the base case $n=2$, we have $$E[e^{0.4W_2}] = \sum_{i=0}^{2} P_{i,2-i} E[e^{0.4W_i}] E[e^{0.4W_{n-i}}]$$

$$= 2P_{0,2}E[e^{0.4W_0}]E[e^{0.4W_i}] + P_{i,1}E[e^{0.4W_i}]E[e^{0.4W_i}]$$

$$= \frac{1}{2}e^{0.4}E[e^{0.4W_i}] + \frac{1}{2}.$$

Therefore, $$E[e^{0.4W_2}] = \frac{\frac{1}{2}}{1 - \frac{1}{2}e^{0.4}}$$

$$\le 1.97$$

$$< e^{0.4 \cdot 2}.$$

It remains to show that $E[e^{0.4W_n}] \le e^{0.4n}$ for $n>2$.
Multiplying both sides of Equation (20) by $2^n$, we have $$2^n E[e^{0.4W_n}] = \sum_{i=0}^{n}\binom{n}{i}E[e^{0.4W_i}]E[e^{0.4W_{n-i}}] \quad (21)$$

$$= \sum_{i=2}^{n-2}\binom{n}{i}E[e^{0.4W_i}]E[e^{0.4W_{n-1}}] +$$

$$2\binom{n}{0}E[e^{0.4W_n}]E[e^{0.4W_{n-1}}] +$$

$$2\binom{n}{1}E[e^{0.4W_i}]E[e^{0.4W_{n-1}}]$$

$$= \sum_{i=2}^{n-2}\binom{n}{i}E[e^{0.4W_i}]E[e^{0.4W_{n-1}}] +$$

$$2e^{0.4}E[e^{0.4W_n}] + 2nE[e^{0.4W_{n-1}}]$$

Now, after subtracting both sides of Equation (21) by $2e^{0.4}E[e^{0.4W_n}]$, we apply our inductive assumption that $E[e^{0.4W_i}] \le e^{0.4i}$ for $i=2, \ldots, n-1$, $$(2^n - 2e^{0.4})E[e^{0.4W_n}] = \sum_{i=2}^{n-2}\binom{n}{i}E[e^{0.4W_i}]E[e^{0.4W_{n-1}}] + 2nE[e^{0.4W_{n-1}}]$$

$$\le \sum_{i=2}^{n-2}\binom{n}{i}e^{0.4i}e^{0.4n-i} + 2ne^{0.4(n-1)}$$

$$= \sum_{i=2}^{n-2}\binom{n}{i}e^{0.4n} + 2ne^{0.4n}e^{-0.4}$$

$$= e^{0.4n}(2^n - 2 - 2n) + 2ne^{0.4n}e^{-0.4}$$

$$= e^{0.4n}(2^n - 2e^{0.4}) + 2e^{0.4n}e^{0.4} -$$

$$2e^{0.4n} - 2ne^{0.4n} + 2ne^{0.4n}e^{-0.4}$$

$$= e^{0.4n}(2^n - 2e^{0.4}) + 2ne^{0.4n}((e^{0.4} - 1) - n(1 - e^{-0.4}))$$

For $n>2$, $$n(1-e^{-0.4}) > e^{0.4} - 1.$$

Thus, we conclude that $$(2^n - 2e^{0.4})E[e^{0.4W_n}] < e^{0.4n}(2^n - 2e^{0.4}) \quad (22)$$

And dividing Equation (22) by $2^n - 2e^{0.4}$ yields $$E[e^{0.4W_n}] < e^{0.4n}$$

Lemma 2 Let $W_n$ be the random variable of the number of white leaves in a query tree with n black leaves, then $$Pr\{W_n \ge \alpha\} \le e^{0.4(n-\alpha)}.$$

Proof. The Chernoff Bounds[10, p.39] state that for any random variable X and $\alpha>0$, $$Pr\{X \ge \alpha\} \le e^{-t\alpha}E[e^{tX}] \quad (23)$$

for all $t>0$.

Setting $t=0.4$ and $X=W_n$, we can rewrite Equation (23) as $$PR\{W_n \ge \alpha\} \le e^{-0.4\alpha}E[e^{0.4W_n}].$$

And by Lemma 1, we have $$Pr\{W_n \geq a\} \leq e^{-0.4n}e^{0.4n}$$
$$= e^{-0.4(a-n)}.$$

C Proof of Theorem 3

Theorem 3 With failure probability $p \leq \frac{1}{2}$, the funning time of the $QT^I$ protocol is at most $$\frac{3l+9}{2}n - 1.$$

Proof. There is a probability of $p^n$ that all tags fail to respond. And for $n>1$, there is a probability of $np^{n-1}(1-p)$ that exactly one tag responses.

Let $T(n)$ be the expected running time of the $QT^I$ algorithm when there are n tags to be identified.

First, for the base cases, $$T(0) = l$$
$$T(1) = l$$

For $n \geq 2$, let $$p_n = p^n + np^{n-1}(1-p)$$

$$T(n) \leq p_n T(n) + (1-p_n)\sum_{i=0}^{n} P_{i,n-1} \cdot (T(i) + T(n-i)) + 1 \quad (24)$$

We can rewrite Equation (24) as $$(1-p_n)T(n) = (1-p_n)\sum_{i=0}^{n} P_{i,n-1} \cdot (T(i) + T(n-i)) + 1$$

thus, $$T(n) = \sum_{i=0}^{n} P_{i,n-1} \cdot (T(i) + T(n-i)) + \frac{1}{1-p_n} \quad (25)$$

First, we consider the case when there are two tags to be identified. Since $p^2 + 2p(1-p) = 2p - p^2$, $$T(2) = \frac{1}{2}(T(1) + T(1)) + \frac{1}{2}(T(0) + T(2)) + \frac{1}{1-p_2} \quad (26)$$

Solving Equation (26) for T(2) yields $$T(2) = 3l + \frac{2}{1-p_2}$$

Since $p_2$ is a decreasing function on p, thus $2/(1-p_2)$ is a decreasing function on p. Then, $2/(2-p_2) = 8$ when $p = \frac{1}{2}$, thus $$T(2) \leq 3l + 8$$

Thus, since n=2, $$T(2) \leq \frac{3l+9}{2}(2) - 1.$$

Therefore, the upper bound $$\frac{n+2}{2}n - 1$$

on running time is valid for n=2.

Now we will prove the upper bound for n>2 inductively. We have from Equation (25), $$T(n) = \sum_{i=0}^{n} P_{i,n-1} \cdot (T(i) + T(n-i)) + 1/(1-p_n)$$

$$= \frac{2}{2^n}\sum_{i=0}^{n}\binom{n}{i}T(i) + 1/(1-p_n)$$

Multiplying both sides by $2^{n-1}$, $$2^{n-1}T(n) \leq \sum_{i=0}^{n}\binom{n}{i}T(i) + \frac{2^{n-1}}{1-p_n}$$

$$\leq \sum_{i=2}^{n-1}\binom{n}{i}T(i) + T(0) + nT(1) + T(n) + \frac{2^{n-1}}{1-p_n}$$

Subtract T(n) from both sides and assume that $T(i) \leq ki-1$ for i=2, ..., n-1, where $$k = \frac{3l+0}{2};$$

$$(2^{n-1}-1)T(n) = \sum_{i=2}^{n-1}\binom{n}{i}T(i) + l + nl + \frac{2^{n-2}}{1-p_n}$$

$$\leq \sum_{i=2}^{n-1}\binom{n}{i}(ki-1) + l + nl + \frac{2^{n-1}}{1-p_n}$$

$$= kn(2^{n-1}-2) - (2^n-2-n) + l + nl + \frac{2^{n-1}}{1-p_n}$$

$$= kn(2^{n-1}-1) - kn + -(2^{n-1}-1) + (1+n)(l+1) + \frac{p_n 2^{n-1}}{1-p_n}$$

It is straightforward to verify that $$\frac{p_n 2^{n-1}}{1-p_n} \leq 2n+1$$

for $n \geq 3$. Thus $$(2^{n-1}-1)T(n) \leq kn(2^{n-1}-1) - (2^{n-1}-1) - kn + (1+n)(l+1) + 2n + 1$$

Since for $n \geq 3$, $(1+n)(l+1) + 2n + 1 - kn < 0$, we conclude that $$T(n) \leq kn - 1.$$

D Expected Number of Conflicts Experienced by a Tag

We first prove Theorem 5, assuming Lemma 3 is true. Then we will prove Lemma 3.

D.1 Proof of Theroem 5

Therorem 5 For a system with n tags, a tag is expected to experience no more than 2.21 log n+3.19 conflicts before it successfully transmits its ID.

Proof. From Equation (3), the expected number of conflicting responses a tag experiences, $E[C_w]$, is given by $$E[C_\omega] = \sum_{j=0}^{\infty} 1 - (1-2^{-j})^{n-1}.$$

We first prove by induction on n that, $$\sum_{j=0}^{\infty} 1 - (1-2^{-j})^{n-1} \le \sum_{j=1}^{n-1} \frac{C}{j}, \quad \text{where } C = \log e + 2e^{-\frac{2}{3}} + e^{-\frac{1}{2}} \approx 3.19.$$

Base Case: The statement is true for n=1, 2 and 3.
Inductive Case: Assume the statement is true for n−1, where $n \ge 4$. In other words, $$\sum_{j=0}^{\infty} 1 - (1-2^{-j})^{n-2} \le \sum_{j=1}^{n-2} \frac{C}{j}.$$

Then we proove the statement is true for n:

$$\sum_{j=0}^{\infty} \left(1 - (1-2^{-j})^{n-1}\right) = \sum_{j=0}^{\infty} \left(1 - (1-2^{-j})^{n-2}(1-2^{-j})\right)$$

$$= \sum_{j=0}^{\infty} 1 - (1-2^{-j})^{n-2} + 2^{-j}(1-2^{-j})^{n-2}$$

$$\le \sum_{j=1}^{n-2} \frac{C}{j} + \sum_{j=0}^{\infty} 2^{-j}(1-2^{-j})^{n-2}, \text{ by inductive hypothesis}$$

$$\le \sum_{j=1}^{n-2} \frac{C}{j} + \frac{C}{n-1}, \text{ by Lemma 3}$$

$$= \sum_{j=1}^{n-1} \frac{C}{j}.$$

Because of the following fact:

$$\sum_{j=1}^{n} \frac{1}{j} \le 1 + \ln n,$$

the expected number of collisions experienced by a tag is at most:

$C(1+ln(n-1)),$ which is less than 2.21 log n+3.19.

D.2 Proof of Lemma 3

We organize the proof as follows. We split the series $$\sum_{j=0}^{\infty} 2^{-j}(1-2^{-j})^n$$

into 8 parts:

1. $\sum_{j=0}^{p_1} 2^{-j}(1-2^{-j})^n$,

2. $\sum_{j=p_1+1}^{p_2-1} 2^{-j}(1-2^{-j})^n$, and

3. $\sum_{j=p_2}^{\infty} 2^{-j}(1-2^{-j})^n$, where $p_1 = \lfloor \log(n+1) \rfloor - 1$ and $p_2 = \lfloor \log(n+1) \rfloor + 2$. We give an upper bound on each part, as stated in Lemmas 11, 12, and 13. From the lemmas we can give an upper bound on the series as a whole.

We first prove the following two lemmas, which will be used in the proofs of Lemmas 11 and 12.

Lemma 9 Let $f(x) = 2^{-x}(1-2^{-x})^n$. For non-negative x, $f'(x) > 0$ if and only if $x < \log(n+1)$.

Proof.

$$f'(x) = -n2^{-x}(1-2^{-x})^{n-1}\left(\frac{d2^{-x}}{dx}\right) + (1-2^{-x})^n\left(\frac{d2^{-x}}{dx}\right)$$

$$= \left(\frac{d2^{-x}}{dx}\right)(1-2^{-x})^{n-1}(1-2^{-x}-n2^{-x})$$

$$= \left(\frac{d2^{-x}}{dx}\right)(1-2^{-x})^{n-1}(1-(n+1)2^{-x}).$$

Since $2^{-x}$ is strictly decreasing, $$\frac{d2^{-x}}{dx} < 0,$$

Also, $(1-2^{-x})^{n-1} > 0$ for x>0. Therefore f'(x)>0 if and only if:

$1-(n+1)2^{-x} < 0.$

Solving the inequality gives us:

$x < \log(n+1)$

Lemma 10 $\int_a^b 2^{-x}(1-2^{-x})^n dx =$ $$\frac{1}{(n+1)\ln 2}\left((1-2^{-b})^{n+1} - (1-2^{-a})^{n+1}\right) \text{ for any } a, b.$$

Proof. Let $y = 2^{-x}$. Then we have:

$$\frac{1}{y}\frac{dy}{dx} = -\ln 2. \tag{27}$$

Therefore, $$\int_a^b 2^{-x}(1-2^{-x})^n dx = \int_{2^{-a}}^{2^{-b}} y(1-y)^n \frac{-1}{y\ln 2} dy$$

$$= \frac{-1}{\ln 2}\int_{2^{-a}}^{2^{-b}}(1-y)^n dy$$

$$= \frac{1}{\ln 2}\int_{y=2^{-a}}^{y=2^{-b}}(1-y)^n d(1-y)$$

$$= \frac{1}{\ln 2}\int_{1-2^{-a}}^{1-2^{-b}} x^n dz$$

$$= \frac{1}{(n+1)\ln 2}[z^{n+1}]_{1-2^{-a}}^{1-2^{-b}}$$

$$= \frac{1}{(n+1)\ln 2}\big((1-2^{-b})^{n+1} - (1-2^{-a})^{n+1}\big).$$

Lemma 11 $\sum_{j=0}^{p_1} 2^{-j}(1-2^{-j})^n \le \frac{1}{(n+1)\ln 2}\left(1 - \frac{1}{n+1}\right)^{n+1}$, where $p_1 = \lfloor \log(n+1)\rfloor - 1$.

Proof. By Lemma 9, $f(x)=2^{-x}(1-2^{-x})^n$ is strictly increasing for $0 \le x < \log(n+1)$. Therefore, for any $j=1, 2, \ldots, p_1$, $f(x) \ge f(j)$ for $j < x \le j+1$. It follows that:

$$\int_j^{j+1} 2^{-x}(1-2^{-x})^n dx = \int_j^{j+1} f(x)dx$$

$$> \int_j^{j+1} f(j)dx$$

$$= \int_j^{j+1} 2^{-j}(1-2^{-j})^n dx$$

$$= 2^{-j}(1-2^{-j})^n.$$

Summing up the inequalities for $j=1, \ldots, p_1$, we have:

$$\sum_{j=1}^{p_1}\int_j^{j+1} 2^{-x}(1-2^{-x})^n dx > \sum_{j=1}^{p_1} 2^{-j}(1-2^{-j})^n$$

$$= \sum_{j=0}^{p_1} 2^{-j}(1-2^{-j})^n.$$

Therefore, we have:

$$\sum_{j=0}^{p_1} 2^{-j}(1-2^{-j})^n < \int_1^{p_1+1} 2^{-x}(1-2^{-x})^n dx$$

$$= \int_1^{\lfloor \log(n+1)\rfloor} 2^{-x}(1-2^{-x})^n dx$$

$$\le \int_1^{\log(n+1)} 2^{-x}(1-2^{-x})^n dx$$

$$= \frac{1}{(n+1)\ln 2}\big((1-2^{-\log(n+1)})^{n+1} -$$

$$(1-2^{-1})^{n+1}\big), \text{ by Lemma 10,}$$

$$= \frac{1}{(n+1)\ln 2}\left(\left(1 - \frac{1}{n+1}\right)^{n+1} - \left(\frac{1}{2}\right)^{n+1}\right)$$

$$< \frac{1}{(n+1)\ln 2}\left(1 - \frac{1}{n+1}\right)^{n+1}.$$

-continued

Lemma 12 $\sum_{j=p_2}^{\infty} 2^{-j}(1-2^{-j})^n \le \frac{1}{(n+1)\ln 2}\left(1-\left(1-\frac{1}{n+1}\right)^{n+1}\right)$, where $p_2 = \lfloor \log(n+1)\rfloor + 2$.

Proof. The proof is similar to the proof of Lemma 11. By Lemma 9, $f(x)=2^{-x}(1-2^{-x})^n$ is non-increasing for $x \ge \log(n+1)$. Therefore, for any $j=p_2, p_2+1, \ldots$, we have $f(x) \ge f(j)$ for $j-1 \le x \le j$. It follows that $$\int_{j-1}^j 2^{-x}(1-2^{-x})^n dx = \int_{j-1}^j f(x)dx$$

$$\ge \int_{j-1}^j f(j)dx$$

$$= \int_{j-1}^j 2^{-j}(1-2^{-j})^n dx$$

$$= 2^{-j}(1-2^{-j})^n.$$

Summing up the inequalities for $j=p_2, p_2+1, \ldots$, we have:

$$\sum_{j=p_2}^{k-1} \int_{j-1}^j 2^{-x}(1-2^{-x})^n dx \ge \sum_{j=p_2}^{k-1} 2^{-j}(1-2^{-j})^n.$$

Therefore, it follows that:

$$\sum_{j=p_2}^{\infty} 2^{-j}(1-2^{-j})^n \le \sum_{j=p_1}^{\infty}\int_{j-1}^j 2^{-x}(1-2^{-x})^n dx$$

$$= \int_{p_2-1}^{\infty} 2^{-x}(1-2^{-x})^n dx$$

$$= \int_{\lfloor \log(n+1)\rfloor+1}^{\infty} 2^{-x}(1-2^{-x})^n dx$$

$$\le \int_{\log(n+1)}^{\infty} 2^{-x}(1-2^{-x})^n dx$$

$$= \frac{1}{(n+1)\ln 2}\big((1-2^{-(x+1)})^{k+1} -$$

$$(1-2^{-\log(n+1)})^{n+1}\big), \text{ by Lemma 10}$$

$$< \frac{1}{(n+1)\ln 2}\left(1-\left(1-\frac{1}{n+1}\right)^{n+1}\right).$$

Lemma 18 $\sum_{j=p_1+1}^{p_2-1} 2^{-j}(1-2^{-j})^n \le \frac{1}{n+1}\left(\frac{2}{r_e} + \frac{3}{o_e}\right)$ for $n \ge 2$, where $p_1 = \lfloor \log(n+1)\rfloor - 1$, $p_2 = \lfloor \log(n+1)\rfloor + 2$.

Proof.

-continued $$\sum_{j=p_1+1}^{p_2-1} 2^{-j}(1-2^{-j})^n = \sum_{j=\lfloor \log(n+1) \rfloor}^{\lfloor \log(n+1) \rfloor+1} 2^{-j}(1-2^{-j})^n$$

$$= 2^{-\lfloor \log(n+1) \rfloor}(1-2^{-\lfloor \log(n+1) \rfloor})^n +$$

$$2^{-(\lfloor \log(n+1) \rfloor+1)}(1-2^{-(\lfloor \log(n+1) \rfloor+1)})^n$$

$$\leq 2^{-\log(n+1)+1}(1-2^{-\log(n+1)})^n +$$

$$2^{-\log(n+1)}(1-2^{-\log(n+1)+1})^n$$

$$= \frac{2}{n+1}\left(1-\frac{1}{n+1}\right)^n + \frac{1}{n+1}\left(1-\frac{1}{2(n+1)}\right)^n$$

$$\leq \frac{2}{n+1}e^{-\frac{n}{n+1}} + \frac{1}{n+1}e^{-\frac{n}{2(n+1)}}$$

$$\leq \frac{2}{n+1}e^{-\frac{2}{3}} + \frac{1}{n+1}e^{-\frac{1}{2}} \text{ for } n \geq 2$$

$$= \frac{1}{n+1}\left(2e^{-\frac{2}{3}} + e^{-\frac{1}{2}}\right).$$

Now, we are ready to prove Lemma 3.

Lemma 3 For $n \geq 2$, $$\sum_{j=0}^{\infty} 2^{-j}(1-2^{-j})^n < \frac{\log e + 2e^{-\frac{2}{3}} + e^{-\frac{1}{2}}}{n+1}.$$

Proof. Let $p_1 = \lfloor \log(n+1) \rfloor - 1$, $p_2 = \lfloor \log(n+1) \rfloor + 2$.

$$\sum_0^{\infty} 2^{-j}(1-2^{-j})^n = \sum_0^{p_1} 2^{-j}(1-2^{-j})^n + \sum_{p_2+1}^{p_2-1} 2^{-j}(1-2^{-j})^n + \sum_{p_2}^{\infty} 2^{-j}(1-2^{-j})^n$$

$$\leq \frac{1}{(n+1)\ln 2}\left(1-\frac{1}{n+1}\right)^{n+1} + \frac{1}{n+1}\left(2e^{-\frac{2}{3}} + e^{-\frac{1}{2}}\right) +$$

$$\frac{1}{(n+1)\ln 2}\left(1-\left(1-\frac{1}{n+1}\right)^{n+1}\right)$$

$$= \frac{1}{n+1}\left(\frac{1}{\ln 2} + 2e^{-\frac{2}{3}} + e^{-\frac{1}{2}}\right)$$

E Proofs of Theorems 6, 7, and 8

Theorem 6 Let there be n tags to be identified. The expected reader communication complexity for QT is 2.89kn. The expected tag communication complexity is $2.21k \log_2 n + 4.19k$.

Proof. Since the expected running time is at most 2.887n−1, and the length of each query is at most K. Therefore the expected total number of bits sent by thereader is at most 2.89kn.

The expected depth of a black node is $3.19 + 2.21 \log_2 n$. On each step, the tag sends a k-bit ID, then the expected tag communication complexity is at most $2.21k \log_2 n + 4.19k.$ Theorem 7 Let there be n tags to be identified. The expected reader communication complexity of QT-sl is at most $3.89kn + 3.89n$. The expected tag communication complexity of QT-sl is at most $2.21 \ln n + k + 4.19$.

Proof. Note that with QT-sl protocol, we need one extra bit to specify whether the query is short or long.

The expected total number of short and long queries is at most 3.887n−1. Each query is at most k+1-bit long, thus the expected reader communication complexity is at most $(3.887n−1)(k+1) < 3.89kn + 3.89n.$ The expected depth of a black node is $3.19 + 2.21 \log_2 n$. For each short query, the tag sends a 1 response. For the long query, the tag sends a k-bit ID. Therefore, the expected tag communication complexity is at most $2.21 \log_2 n + k + 4.19.$ Theorem 8 The expected reader communication complexity of QT-im protocol is at most $2.21n \log_2 n + 6.10n$.

Proof. We can partition the queries in the groups such that each group ends with a long query. We can find the number of bits transmitted in each group. The total bits of short queries transmitted is just the one plus the expected prefix when a tag is identified:

$3.19 + 2.21 \log_2 n + 1 = 2.21 \log_2 n + 4.19$

We need 2 bits for each long query, thus 2n in total. Each white node will need 1 extra bit for the reactivate command. Since there are at most 0.444n white nodes in expectation, the expected reactivate overhead is at most 0.89n.

The expected reader communication complexity is at most $2.21n \log_2 n + 7.08n.$

What is claimed is:

1. A method of identifying a plurality of tags, said method comprising:
    (a) maintaining a set of query strings;
    (b) selecting a string from the set of query strings;
    (c) removing the selected string from the set of query strings;
    (d) broadcasting to the plurality of tags a query message containing at least a portion of the selected string;
    (e) receiving a response from the plurality of tags; and
    (f) if the plurality of tags includes any unidentified tags, repeating steps (b) through (f).

2. The method of claim 1 wherein the query message includes the entire selected string.

3. The method of claim 1 further comprising if the received response identifies one of said plurality of tags, storing the identity of the identified tag.

4. The method of claim 1 further comprising if the received response indicates a collision has occurred, appending a first extension to the selected string to generate a first new query string and adding the first new query string to the set of query strings.

5. The method of claim 4 further comprising if the received response indicates a collision has occurred, appending a second extension to the selected string to generate a second new query string and adding the second new query string to the set of query strings.

6. The method of claim 5 wherein the appending the first extension to the selected string involves appending the first extension to the end of the selected string as a suffix to generate the first new query string.

7. The method of claim 6 wherein the appending the second extension to the selected string involves appending the second extension to the end of the selected string as a suffix to generate the second new query string.

8. The method of claim 4 wherein the first extension is a one.

9. The method of claim 5 wherein the second extension is a zero.

10. The method of claim 1 further comprising if the received response indicates a collision has occurred, appending a 00 to the selected string to generate a first new query string, appending a 01 to the selected string to generate a second new query string, appending a 10 to the selected string to generate a third new query string, appending a 11 to the selected string to generate a fourth new query string, and adding the first second, third, and fourth new query strings to the set of query strings.

11. The method of claim 1 wherein maintaining the set of query strings comprises initializing the set of query strings with a 0 and a 1.

12. The method of claim 1 further comprising repeating steps broadcasting the same query message and receiving the response for a pre-determined number of times if no collision is detected in the response.

13. The method of claim 1 wherein the receiving step further comprising estimating the number of tags in the response.

14. The method of claim 4 further comprising skipping a string having a second extension that is complementary to the first extension if there is no response to a query message containing the first new query string from the plurality of the tags.

15. The method of claim 1 wherein the broadcasting step includes broadcasting a short command in the query message to induce a one-bit response from the plurality of the tags.

16. The method of claim 1 wherein the set of query strings has an order wherein a length of any first query string occurring after a second query string is greater than or equal to a length of the second query string.

17. A system for identifying a plurality of tags, said system comprising:
   a transceiver;
   storage; and
   a controller, said controller programmed to perform the functions of:
      (a) maintaining a set of query strings;
      (b) selecting a string from the set of query strings;
      (c) removing the selected string from the set of query strings;
      (d) causing the transmitter to broadcast to the plurality of tags a query message containing at least a portion of the selected string;
      (e) receiving through the transceiver a response from the plurality of tags; and
      (f) if the plurality of tags includes any unidentified tags, repeating steps (b) through (f).

18. The system of claim 17 wherein the query message includes the entire selected string.

19. The system of claim 17 wherein the controller is further programmed to perform the functions of storing the identity of the identified tag if the received response identifies one of said plurality of tags.

20. The system of claim 17 wherein the controller is further programmed to perform the functions of, if the received response indicates a collision has occurred, appending a first extension to the selected string to generate a first new query string and adding the first new query string to the set of query strings.

21. The system of claim 20 wherein the controller is further programmed to perform the functions of, if the received response indicates a collision has occurred, appending a second extension to the selected string to generate a second new query string and adding the second new query string to the set of query strings.

22. The system of claim 21 wherein the appending the first extension to the selected string involves appending the first extension to the end of the selected string as a suffix to generate the first new query string.

23. The system of claim 22 wherein the appending the second extension to the selected string involves appending the second extension to the end of the selected string as a suffix to generate the second new query string.

24. The system of claim 20 wherein the first extension is a one.

25. The system of claim 21 wherein the second extension is a zero.

26. The system of claim 17 wherein the controller is further programmed to perform the functions of, if the received response indicates a collision has occurred, appending a 00 to the selected string to generate a first new query string, appending a 01 to the selected string to generate a second new query string, appending a 10 to the selected string to generate a third new query string, appending a 11 to the selected string to generate a fourth new query string, and adding the first second, third, and fourth new query strings to the set of query strings.

27. The system of claim 17 wherein maintaining the set of query strings comprises initializing the set of query strings with a 0 and a 1.

28. The method of claim 16 wherein the selected string is selected from the beginning of the set of query strings.

29. The system of claim 17 wherein the set of query strings has an order wherein a length of any first query string occurring after a second query string is greater than or equal to a length of the second query string.

30. The system of claim 29 wherein the selected string is selected from the beginning of the set of query strings.

* * * * *